United States Patent
Gardner et al.

[11] 3,717,899
[45] Feb. 27, 1973

[54] RESIN RADIUS ROLLER

[75] Inventors: Charles R. Gardner, Glendale, Jay Johnson, La Canada, both of Calif.

[73] Assignee: Republic Corporation, Century City, Calif.

[22] Filed: Dec. 17, 1970

[21] Appl. No.: 99,209

[52] U.S. Cl. .............. 15/230.11, 29/121 A, 29/122, 156/579, 264/296, 264/309
[51] Int. Cl. ............................................. B29d 9/02
[58] Field of Search ................ 15/27, 210.5, 230.11; 29/110.5, 121 A, 122, 125; 33/41 C; 401/9, 208, 218, 219, 220; 101/328-331

[56] References Cited

UNITED STATES PATENTS

| | | | |
|---|---|---|---|
| 2,621,652 | 12/1952 | Ehrhardt | 128/57 |
| 2,538,241 | 1/1951 | Guimond | 15/230.11 |
| 3,089,180 | 5/1963 | Humphrey | 401/9 |
| 3,332,131 | 7/1967 | Weiler | 29/110.5 X |

FOREIGN PATENTS OR APPLICATIONS

| | | | |
|---|---|---|---|
| 589,240 | 3/1959 | Italy | 15/230.11 |
| 11,156 | 7/1915 | Great Britain | 128/57 |
| 989,965 | 4/1965 | Great Britain | 29/125 |

*Primary Examiner*—Daniel Blum
*Attorney*—Johnston, Root, O'Keeffe, Keil, Thompson & Shurtieff

[57] ABSTRACT

A resin radius roller for use in connection with resin impregnated fibrous materials which includes a shaft having a handle at one end and an axle, perpendicularly arranged, at the other end, and wheels having circular fins rotatably mounted on the axle on either side of the shaft, said fins decreasing in diameter as their distance from said shaft increases, said wheels being free to move laterally as well as with a rocking motion. The resin radius roller can be used in the corner of a mold to work air bubbles out of resinous materials without in any way catching or snagging the material being rolled.

14 Claims, 6 Drawing Figures

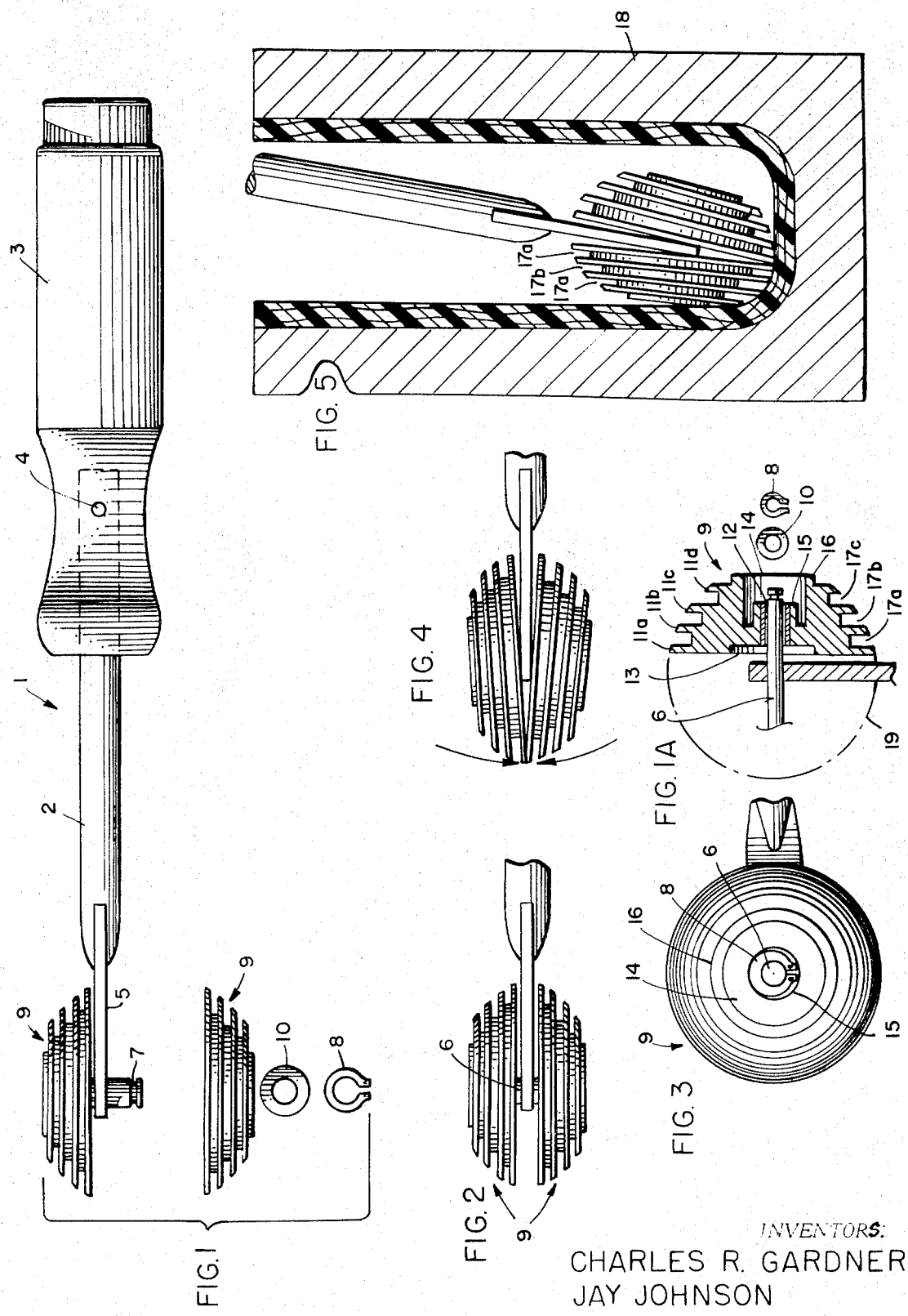

RESIN RADIUS ROLLER

BACKGROUND OF INVENTION

The present invention relates to a device for rolling resin impregnated fibrous materials. More particularly, the invention consists of a device for rolling resin impregnated fibrous materials in the corners of a mold whereby entrapped air is removed from the fibrous materials.

Reinforced plastics are extensively utilized as protective coatings and as building materials. Impregnated glass fiber sheets or blankets, for example, are widely used to produce boat hulls, automobile bodies, and numerous other products. The plastic substance that is mixed with or applied to the reinforcing glass fiber, asbestos, or the like, is generally either a polyester resin, epoxy resin, phenolic resin, melamine resin, silicon resin, polyvinyl chloride resin or polystyrene resin.

In producing a product or coating a structure, the reinforcing material is customarily laid up against forms or in molds and the resin is applied by means of a brush, ordinary paint roller, or spray gun. The resin is brushed out or rolled out on the fibrous blanket or mat in much the same manner as paint is applied to a surface. When paint rollers or brushes are used to apply the resin, air bubbles are entrapped in the resin. This air must be removed if a satisfactory surface is to be obtained. Special resin rollers (U.S. Pat. No. 3,082,459) have been designed which are capable of removing the entrapped air from broad, flat surfaces. Such rollers are not capable of removing air from resinous materials in the corners of molds, however, and often tend to damage fibers, thus causing the formation of a defective product.

It is an object of the present invention to provide an improved resin roller for removing entrapped air from resin impregnated fibrous materials.

Another object of the present invention is to provide an improved resin roller capable of removing air entrapped in resinous materials in the corners of a mold.

Still another object of the present invention is to provide an improved resin roller capable of removing air entrapped in resinous material without damaging the material.

Other objects of the invention will become apparent to those skilled in the art from the following description of the invention.

BRIEF DESCRIPTION OF THE INVENTION

A resin radius roller constructed in accordance with the present invention includes a shaft having a handle at one end and an axle mounted perpendicularly at the other end. The axle is arranged such that approximately one-half the axle is on one side of the shaft and one-half the axle extends on the other side of the shaft. Wheels, made of metal, plastic, rubber, or other resin resistant material, are rotatably mounted on the axle, one wheel on each side of the shaft. The axle extends through a bore, centrally located in each wheel. The bore is slightly larger than the diameter of the axle, thus allowing the wheels to move rotationally on the axles as well as with a rocking motion. The wheels contain a series of circular fin-like structures which have their greatest diameter at a point adjacent to the shaft. The diameter of the fins decreases as their distance from the shaft increases. The decreasing diameters of the fins allow the radius roller to conform to the radius of the mold corner being rolled. By utilizing the ribbed or finned structure for the wheels, air is liberated from the fibrous material and allowed to escape between the fins.

Each wheel contains a recess, coaxial with the azle, and communicating with the bore thru which the axle protrudes. The axle therefore extends through the bore and into the recess. In the recess, a snap ring, or similar device, is placed on the axle, to prevent the wheel from coming off the axle. Neither the axle nor the snap ring protrude beyond the recess. This prevents the axle from damaging or snagging the fibrous materials when the resin radius roller is being used in the corner of a mold.

Additional features and advantages of the invention will become apparent from the following detailed description of specific embodiments when taken in conjunction with the accompanying drawings.

DESCRIPTION OF THE DRAWINGS

FIG. 1 is a side view partially exploded of the resin radius roller.

FIG. 1A is a side section view of one of the wheels of the resin radius roller.

FIG. 2 is a side view of one end of the resin radius roller showing both wheels mounted in place.

FIG. 3 is a top view of the resin roller as depicted in FIG. 1.

FIG. 4 is a side view of one end of the resin radius roller showing the wheels in the contacting position.

FIG. 5 is an end view of a mold, partially in section, showing a resin radius roller in use.

DESCRIPTION OF THE PREFERRED EMBODIMENTS

FIG. 1 is a side view of a resin roller 1 having a shaft 2. Handle 3 is attached to shaft 2 by means of pin 4. The handle and shaft, of course, can be of one-piece construction. Flattened section 5 of shaft 2 includes axle 6 rigidly mounted at right angles to shaft 2. Axle 6 is arranged such that approximately one-half of the axle protrudes on one side of shaft 2 and approximately one-half protrudes on the other side of shaft 2. Axle 6 also contains annular channels 7 designed to receive snap rings 8. Wheels 9, which ordinarily are identical, are rotatably mounted on axle 6. Washer 10 also mounts on axle 6 as shown between wheel 9 and snap ring 8. It is contemplated that the shape of each wheel can be varied. The wheels can also be replaced with wheels having a straighter or rounder configuration when the shape of the mold is changed.

FIG. 1A is a side sectional view taken thru wheel 9. Fins 11a, 11b, 11c and 11d are arranged as shown on wheel 9. Fins 11a, 11b, 11c and 11d may generally follow the contour of a circle 19 as shown in FIG. 1A. The radius of circle 19 should generally approximate the radius of the corner being rolled; however, this is not critical. Bore 12, axially situated as shown in wheel 9, is slightly larger in diameter than axle 6, such that wheel 9 can rock on axle 6 as well as rotate. Bore 13, also axially arranged, is provided to eliminate interference between wheel 9 and the flattened end 5 of shaft 2 when the resin radius roller 2 is being used in the corner of a mold and the wheels are in the contacting position as shown in FIGs. 4 and 5. Recessed bore 14 with hub 15 is provided to ensure that when washer 10 and snap ring 8 are engaged on axle 6, axle 6 will not project beyond surface 16 of wheel 9, thus preventing axle 6 from catching, snagging or damaging any resinous material being rolled. When the roller is being used in the corner of a mold, the liberated air is allowed to escape through annular channels 17a, 17b and 17c.

FIGS. 2 and 3 are side and top views, respectively, of one end of the resin roller showing wheels 9 assembled to axle 6. Snap ring 8 is shown in FIG. 3 assembled to axle 6. Hub 15 is shown situated in recessed area 14.

FIG. 4 is a side view of one end of the resin roller showing the wheels 9 in the contacting position. Wheels 9 assume this position when roller 1 is being used in the corner of a mold as shown in FIG. 6.

FIG. 5 shows resin radius roller 1 being used to liberate air bubbles from resinous materials in the corner of mold 18. The liberated air is allowed to escape through annular channels 17a, 17b and 17c in wheels 9.

As suggested above, the diameters of fins 11a, 11b, 11c and 11d are not critical, but should be chosen such that circle 19 approximates the contour of the corner being rolled. In general, a diameter of from 1 inch to 3 inches and preferably from 1 ¾ inches to 2 ¼ inches has been found to be useful for fin 11a, taking into consideration hand pressure and the drag factor. The diameter of fins 11b, 11c, and 11d would then be a function of the radius of curvature of the corner being rolled. A diameter of from about ¾ inch to about 1 ¾ inches for fin 11d is satisfactory for most purposes. Similarly, the number of fins, their thickness and the spacing between fins is a function of the radius of curvature of the corner being rolled. Spacings of from 1/32 to 3/16 inch and preferably from 1/16 inch to ⅛ inch are satisfactory for most purposes. The roller will include at least three fins in most instances. It has been found that five fins are useful for most purposes. It is contemplated, however, that as many as 10 fins or more can be employed in rolling out the corners of certain molds.

Obviously, many modifications and variations of the invention as hereinbefore set forth may be made without departing from the spirit and scope thereof, and therefore only such limitations should be imposed as are indicated in the appended claim.

We claim:

1. A device for rolling out reinforced plastics on curved surfaces which comprises in combination:
   a. a shaft having a lower end and a flattened upper end;
   b. handle means arranged at said lower end;
   c. axle means extending through said flattened upper end, said axle means being rigidly attached to said flattened upper end at about its mid-point; and
   d. wheel means rotatably engaged on said axle means on each side of said shaft, said wheel means including a plurality of fins extending outwardly from said wheel means and substantially perpendicular to the axis of rotation of said wheel means and annular channels between said fins to permit air to escape from said reinforced plastics, the diameters of the fins on said wheel being arranged to conform substantially to the radius of the curve being rolled, each fin being of substantially uniform thickness.

2. A device for rolling out reinforced plastics on curved surfaces which comprises, in combination:
   a. a shaft having a lower end and a flattened upper end;
   b. handle means arranged at said lower end;
   c. axle means extending through said flattened upper end, the mid-point of said axle means being rigidly attached to said flattened upper end;
   d. wheel means rotatably engaged on said axle means on each side of said shaft, said wheel means including:
      1. a plurality of fin means extending outwardly from said wheel means and substantially perpendicular to the rotational axis of said wheel means, said fin means being of varying diameters, the largest of said fin means being arranged adjacent to said shaft, the remaining fin means decreasing in diameter as a function of the radius of the curve being rolled;
      2. annular channels located between said fin means to permit air to escape from said reinforced plastics;
      3. hole means coaxially located in said wheel means for engaging said axle means, said hole means being larger than the diameter of said axle, whereby said wheels can rock as well as rotate;
      4. a recess in the outer surface of said wheel means concentric with said hold means; and
      5. means arranged in said recess for retaining said wheel means on said axle means.

3. The device of claim 2, wherein the inner surface of said wheel means includes a bore to minimize interference between said wheel means and said shaft.

4. The device of claim 1, wherein said fin means are of varying diameters, the fin means of largest diameter being adjacent said shaft, the remaining fin means decreasing in diameter as a function of the radius of the curve being rolled.

5. The device of claim 1, wherein said wheel means includes hole means for engaging with said axle means, said hole means being larger than the diameter of said axle means, said wheel means being capable of rocking as well as rotating.

6. The device of claim 5, wherein said wheel means includes a recess in its outer surface concentric with said hole means and means in said recess for retaining said wheel means on said axle means.

7. The device of claim 6, wherein the inner surface of said wheel means includes a bore concentric with said hole means to minimize interference between said wheel means and said shaft.

8. A device for rolling out reinforced plastics on curved surfaces comprising a shaft, handle means arranged at one end of the shaft, axle means extending through and attached to the end of the shaft opposite the handle, and wheel means rotatably engaged on the axle means and on each side of the shaft, said wheel means including a plurality of fin means extending outwardly from said wheel means and substantially perpendicular to the rotational axis of said wheel means, said fin means being of varying diameters, the largest of the fin means adjacent the shaft, the remaining fin means decreasing in diameter as a function of the radius of the curve to be rolled, each fin means being of substantially uniform thickness, and annular channels located between the fin means to permit air to escape from said reinforced plastics.

9. The device of claim 8, wherein the wheel means includes hole means for engaging with said axle means, said hole means being larger than the diameter of said axle means, said wheel means being capable of rocking as well as rotating.

10. The device of claim 9, wherein said shaft adjacent said wheel means is flattened, said wheel means includes a recess in its outer surface concentric with said hole means and means in said recess for retaining said wheel means on said axle means, and said wheel means includes a bore in its inner surface concentric with said hole means to minimize interference between said wheel means and said shaft.

11. The device of claim 1, wherein the circumference of each fin conforms substantially to the curve to be rolled.

12. A device for rolling out reinforced plastics on curved surfaces which comprises in combination: a shaft having a lower end and an upper end; handle means arranged at said lower end; axle means extending through said upper end, said axle means being rigidly attached to said upper end at about its midpoint; and wheel means rotatably engaged on said axle means on each side of said shaft, said wheel means including hole means for engaging with said axle means, said hole means being larger than the diameter of said axle means, said wheel means being capable of rocking as well as rotating, a recess in the outer surface of the wheel means concentric with said hole means and means in said recess for retaining said wheel means on said axle means, said wheel means including a plurality of fins extending outwardly from said wheel means and substantially perpendicular to the axis of rotation of said wheel means and annular channels between said fins to permit air to escape from said reinforced plastics, the diameters of the fins on said wheel means being arranged to conform substantially to the radius of the curve being rolled.

13. The device of claim 12, wherein the inner surface of said wheel means includes a bore concentric with said hole means to minimize interference between said wheel means and said shaft.

14. A device for rolling out reinforced plastics on curved surfaces comprising a shaft, handle means arranged at one end of the shaft, axle means extending through and attached to the end of the shaft opposite the handle, the wheel means rotatably engaged on the axle means and on each side of the shaft, said wheel means including hole means for engaging with said axle means, said hole means being larger than the diameter of said axle means, said wheel means being capable of rocking as well as rotating, a recess in the outer surface of the wheel means concentric with said hole means and means in the recess for retaining said wheel means on said axle means, a bore in the inner surface of the wheel means concentric with said hole means to minimize interference between said wheel means and said shaft, said wheel means including a plurality of fin means extending outwardly from said wheel means and substantially perpendicular to the rotational axis of said wheel means, said fin means being of varying diameters, the largest of the fin means adjacent the shaft, the remaining fin means decreasing in diameter as a function of the radius of the curve to be rolled, and annular channels located between the fin means to permit air to escape from said reinforced plastics.

* * * * *